(12) United States Patent
Su et al.

(10) Patent No.: US 8,837,825 B2
(45) Date of Patent: *Sep. 16, 2014

(54) IMAGE PREDICTION BASED ON PRIMARY COLOR GRADING MODEL

(71) Applicant: Dolby Laboratories Licensing Corporation, San Francisco, CA (US)

(72) Inventors: Guan-Ming Su, Fremont, CA (US); Sheng Qu, San Jose, CA (US); Hubert Koepfer, Milpitas, CA (US); Yufei Yuan, Austin, TX (US); Samir Hulyalkar, Los Gatos, CA (US); Walter Gish, Oak Park, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/198,470

(22) Filed: Mar. 5, 2014

(65) Prior Publication Data

US 2014/0185930 A1  Jul. 3, 2014

Related U.S. Application Data

(62) Division of application No. 14/110,701, filed as application No. PCT/US2012/033651 on Apr. 13, 2012, now Pat. No. 8,731,287.

(60) Provisional application No. 61/475,372, filed on Apr. 14, 2011.

(51) Int. Cl.
| | | |
|---|---|---|
| G06K 9/36 | (2006.01) | |
| H04N 19/186 | (2014.01) | |
| H04N 19/105 | (2014.01) | |
| G06T 5/50 | (2006.01) | |
| G06T 5/00 | (2006.01) | |
| H04N 19/136 | (2014.01) | |
| H04N 19/36 | (2014.01) | |

(52) U.S. Cl.
CPC ............ *G06T 5/50* (2013.01); *H04N 19/00315* (2013.01); *H04N 19/00024* (2013.01); *G06T 5/009* (2013.01); *H04N 19/00139* (2013.01); *H04N 19/00448* (2013.01)
USPC .......................................... 382/166; 382/238

(58) Field of Classification Search
USPC .......................... 382/166, 232, 233, 238, 239
See application file for complete search history.

(56) References Cited

U.S. PATENT DOCUMENTS

| | | |
|---|---|---|
| 5,010,405 A | 4/1991 | Schreiber et al. |
| 5,428,398 A | 6/1995 | Faroudja |

(Continued)

FOREIGN PATENT DOCUMENTS

| | | |
|---|---|---|
| EP | 1827024 | 8/2007 |
| EP | 2 290 983 | 3/2011 |

(Continued)

OTHER PUBLICATIONS

Liu, S. et al. "Bit-Depth Scalable Coding for High Dynamic Range Video" Proc. of SPIE Conference on Visual Communications and Image Processing, 2008.

(Continued)

*Primary Examiner* — Duy M Dang

(57) ABSTRACT

Inter-color image prediction is based on color grading modeling. Prediction is applied to the efficient coding of images and video signals of high dynamic range. Prediction models may include a color transformation matrix that models hue and saturation color changes and a non-linear function modeling color correction changes. Under the assumption that the color grading process uses a slope, offset, and power (SOP) operations, an example non linear prediction model is presented.

16 Claims, 3 Drawing Sheets

(56) References Cited

U.S. PATENT DOCUMENTS

| | | |
|---|---|---|
| 5,450,500 A | 9/1995 | Brett |
| 5,561,467 A | 10/1996 | Takeuchi |
| 5,784,572 A | 7/1998 | Rostoker |
| 6,026,179 A | 2/2000 | Brett |
| 6,028,646 A | 2/2000 | Jeong |
| 6,111,607 A | 8/2000 | Kameyama |
| 6,771,311 B1 | 8/2004 | Weldy |
| 6,785,330 B1 | 8/2004 | Whealton |
| 7,747,098 B2 | 6/2010 | Ward |
| 8,218,625 B2 | 7/2012 | Ward |
| 8,295,625 B2 | 10/2012 | Gao |
| 8,537,893 B2 | 9/2013 | Efremov |
| 8,731,287 B2 * | 5/2014 | Su et al. .................. 382/166 |
| 2002/0163676 A1 | 11/2002 | Jones |
| 2003/0215011 A1 | 11/2003 | Wang |
| 2004/0017852 A1 | 1/2004 | Garrido |
| 2004/0264791 A1 | 12/2004 | Jiang |
| 2005/0185937 A1 | 8/2005 | Comer |
| 2006/0104508 A1 | 5/2006 | Daly |
| 2009/0238535 A1 | 9/2009 | Robertson |
| 2013/0148029 A1 | 6/2013 | Gish |

FOREIGN PATENT DOCUMENTS

| | | |
|---|---|---|
| GB | 2265783 | 5/1996 |
| WO | 2005/101309 | 10/2005 |
| WO | 2007/139534 | 12/2007 |
| WO | 2010/105036 | 9/2010 |
| WO | 2012/125802 | 9/2012 |
| WO | 2012/142471 | 10/2012 |

OTHER PUBLICATIONS

Gao, Y. et al. "H.264/Advanced Video Coding (AVC) Backward-Compatible Bit-Depth Scalable Coding", IEEE Trans. on Circuits and Systems for Video Technology, vol. 19, No. 4, Apr. 2009, pp. 500-510.

Winken, M. et al. "Bit-Depth Scalable Video Coding", IEEE International Conference on Image Processsing, 2007.

Scratch User Guide version 5.1, Jul. 2010.

Framecycler D1 2010 User Guide, http://doc.iridas.com/index.php/IRIDAS_Online_Documentation.

SpeedGrace D1 2010 User Guide, http://doc.iridas.com/index.php/IRIDAS_Online_Documentation.

Mantiuk, R. et al. "Perception-Motivated High Dynamic Range Video Encoding" vol. 23, ACM Transactions on Graphics Proceedings of ACM SIGGRAPH Aug. 2004.

Pines, J. et al. ASC Color Decision List (ASC CDL) Transfer Functions and Interchange Syntax published by the American Society of Cinematographers, May 2009.

Nocedal, J. et al. "Numerical Optimization", Chapter , Levenberg-Marquard Metod, Springer 1999.

* cited by examiner

IMAGE PREDICTION BASED ON PRIMARY COLOR GRADING MODEL

CROSS-REFERENCE TO RELATED APPLICATIONS

This application is a continuation of U.S. patent application Ser. No. 14/110,701, filed on Oct. 8, 2013, now U.S. Pat. No. 8,731,287, which is the National stage entry of PCT Application Ser. No. PCT/US2012/033651 filed on Apr. 13, 2012, which claims priority to U.S. Provisional Patent Application Ser. No. 61/475,372, filed on Apr. 14, 2011, each of which is incorporated herein by reference in its entirety.

TECHNICAL FIELD

The present invention relates generally to images. More particularly, an embodiment of the present invention relates to a multiple-color channel predictor between high dynamic range images and standard dynamic range images based on a primary color grading model.

BACKGROUND OF THE INVENTION

As used herein, the term 'dynamic range' (DR) may relate to a capability of the human psychovisual system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). For example, well adapted humans with essentially normal (e.g., in one or more of a statistical, biometric or opthamological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the terms 'visual dynamic range' or 'variable dynamic range' (VDR) may individually or interchangeably relate to the DR that is simultaneously perceivable by a HVS. As used herein, VDR may relate to a DR that spans 5-6 orders of magnitude. Thus while perhaps somewhat narrower in relation to true scene referred HDR, VDR nonetheless represents a wide DR breadth. As used herein, the term 'simultaneous dynamic range' may relate to VDR.

Until fairly recently, displays have had a significantly narrower DR than HDR or VDR. Television (TV) and computer monitor apparatus that use typical cathode ray tube (CRT), liquid crystal display (LCD) with constant fluorescent white back lighting or plasma screen technology may be constrained in their DR rendering capability to approximately three orders of magnitude. Such conventional displays thus typify a low dynamic range (LDR), also referred to as a standard dynamic range (SDR), in relation to VDR and HDR.

Advances in their underlying technology however allow more modern display designs to render image and video content with significant improvements in various quality characteristics over the same content, as rendered on less modern displays. For example, more modern display devices may be capable of rendering high definition (HD) content and/or content that may be scaled according to various display capabilities such as an image scaler. Moreover, some more modern displays are capable of rendering content with a DR that is higher than the SDR of conventional displays.

For example, some modern LCD displays have a backlight unit (BLU) that comprises a light emitting diode (LED) array. The LEDs of the BLU array may be modulated separately from modulation of the polarization states of the active LCD elements. This dual modulation approach is extensible (e.g., to N-modulation layers wherein N comprises an integer greater than two), such as with controllable intervening layers between the BLU array and the LCD screen elements. Their LED array based BLUs and dual (or N-) modulation effectively increases the display referred DR of LCD monitors that have such features.

Such "HDR displays" as they are often called (although actually, their capabilities may more closely approximate the range of VDR) and the DR extension of which they are capable, in relation to conventional SDR displays represent a significant advance in the ability to display images, video content and other visual information. The color gamut that such an HDR display may render may also significantly exceed the color gamut of more conventional displays, even to the point of capably rendering a wide color gamut (WCG). Scene related HDR or VDR and WCG image content, such as may be generated by "next generation" movie and TV cameras, may now be more faithfully and effectively displayed with the "HDR" displays (hereinafter referred to as 'HDR displays').

As with the scalable video coding and HDTV technologies, extending image DR typically involves a bifurcate approach. For example, scene referred HDR content that is captured with a modern HDR capable camera may be used to generate an SDR version of the content, which may be displayed on conventional SDR displays. In one approach, generating the SDR version from the captured VDR version may involve applying a global tone mapping operator (TMO) to intensity (e.g., luminance, luma) related pixel values in the HDR content. In a second approach, as described in International Patent Application No. PCT/US2011/048861, herein incorporated by reference for all purposes, generating an SDR image may involve applying an invertible operator (or predictor) on the VDR data. To conserve bandwidth or for other considerations, simultaneous transmission of both the actual captured VDR content and the SDR content may not be a best approach.

Thus, an inverse tone mapping operator (iTMO), inverted in relation to the original TMO, or an inverse operator in relation to the original predictor, may be applied to the SDR content version that was generated, which allows a version of the VDR content to be predicted. The predicted VDR content version may be compared to originally captured HDR content. For example, subtracting the predicted VDR version from the original VDR version may generate a residual image. An encoder may send the generated SDR content as a base layer (BL), and package the generated SDR content version, any residual image, and the iTMO or other predictors as an enhancement layer (EL) or as metadata.

Sending the EL and metadata, with its SDR content, residual and predictors, in a bitstream typically consumes less bandwidth than would be consumed in sending both the HDR and SDR contents directly into the bitstream. Compatible decoders that receive the bitstream sent by the encoder may decode and render the SDR on conventional displays. Compatible decoders however may also use the residual image, the iTMO predictors, or the metadata to compute a predicted version of the HDR content therefrom, for use on more capable displays. It is the purpose of this invention to provide novel methods for generating predictors that allow for the efficient coding, transmission, and decoding of VDR data using corresponding SDR data.

In one example embodiment of this invention, we present a novel VDR predictor that is based on primary color grading. It combines a matrix multiplication operation with scale, offset, and power (SOP) operations. Assuming the SDR content was created using traditional color grading operations, such as: lift, gain, gamma, hue and saturation changes, the disclosed predictor is advantageous over the prior art by yielding smaller prediction error while requiring to estimate only a very small number of prediction coefficients.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Inter-color image prediction that is based on color grading modeling is described herein. Given a pair of corresponding VDR and SDR images, that is, images that represent the same scene but at different levels of dynamic range, this section describes methods that allow an encoder to approximate the VDR image in terms of the SDR image and an inter-color predictor based on a primary color grading model. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to coding images with high dynamic range. An embodiment creates a predictor that allows a VDR image to be expressed in relation to its corresponding SDR representation and parameters of a color grading model.

Example VDR-SDR System

Figure 1:
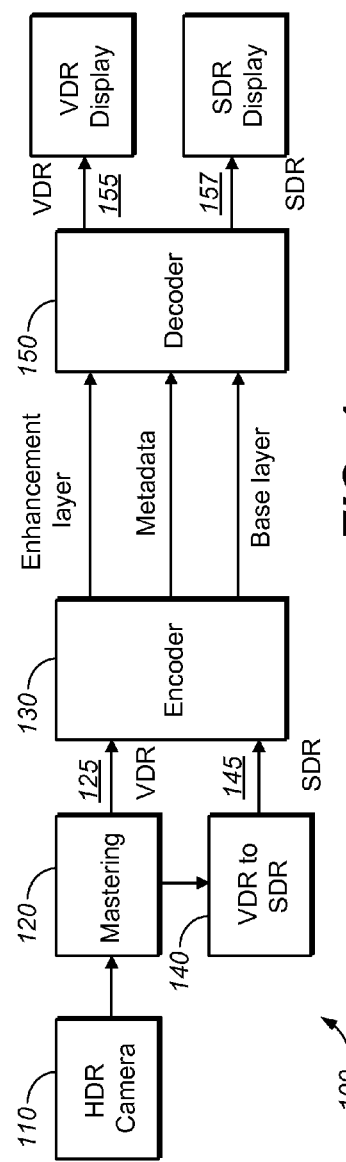
FIG. 1 depicts an example data flow for a VDR-SDR system, according to an embodiment of the present invention.

FIG. 1 depicts an example data flow in a VDR-SDR system 100, according to an embodiment of the present invention. An HDR image or video sequence is captured using HDR camera 110. Following capture, the captured image or video is processed by a mastering process to create a target VDR image 125. The mastering process may incorporate a variety of processing steps, such as: editing, primary and secondary color correction (or grading), color transformation, and noise filtering. The VDR output 125 of this process represents the director's intend on how the captured image will be displayed on a target VDR display.

The mastering process may also output a corresponding SDR image 145, representing the director's intend on how the captured image will be displayed on a legacy SDR display. The SDR output 145 may be provided directly from mastering circuit 120 or it may be generated by a separate VDR-to-SDR converter 140.

In this example embodiment, the VDR 125 and SDR 145 signals are input into an encoder 130. Purpose of encoder 130 is to create a coded bitstream that reduces the bandwidth required to transmit the VDR and SDR signals, but also allows a corresponding decoder 150 to decode and render either the SDR or VDR signals. In an example implementation, encoder 130 may be a layered encoder, such as one of those defined by the MPEG-2 and H.264 coding standards, which represents its output as a base layer, an optional enhancement layer, and metadata. We define as "metadata" any ancillary information that is embedded or transmitted in parallel with the coded bitstream and assists a decoder to render a decoded image. Such metadata may include, but are not limited to, such data as: color space or gamut information, dynamic range information, tone mapping information, or prediction coefficients, such as those described herein.

On the receiver, a decoder 150, uses the received coded bitstreams and metadata to render either an SDR image or a VDR image, according to the capabilities of the target display. For example, an SDR display may use only the base layer and the metadata to render an SDR image. In contrast, a VDR display may use information from all input layers and the metadata to render a VDR signal.

Figure 2:
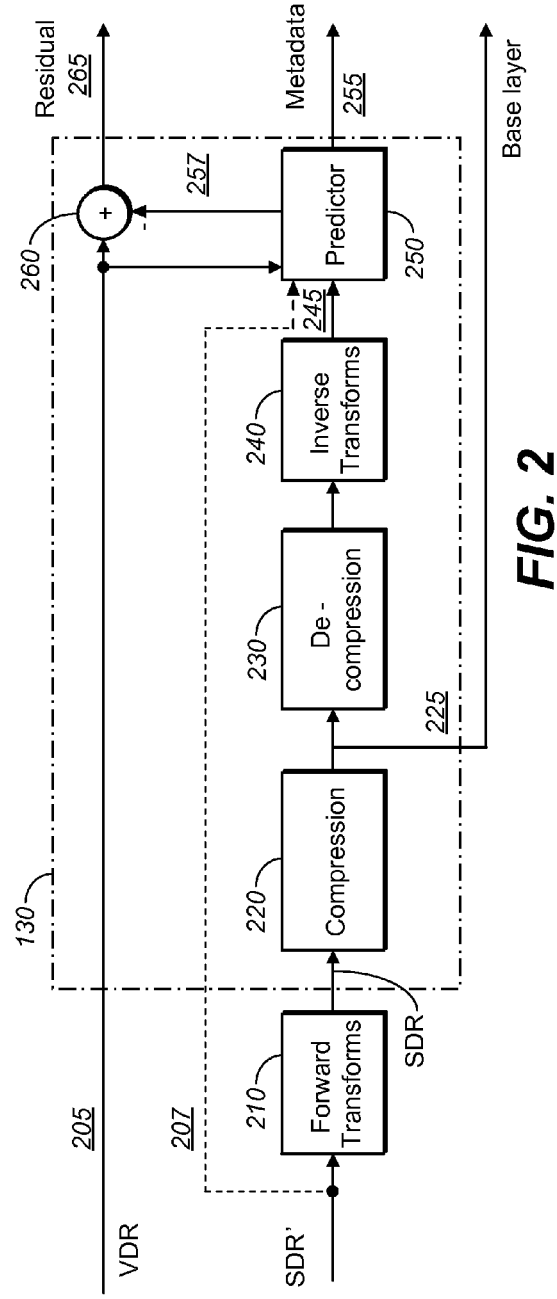
FIG. 2 depicts an example VDR encoding system according to an embodiment of the present invention.

FIG. 2 shows in more detail an example implementation of encoder 130 incorporating the methods of this invention. In FIG. 2, SDR' denotes an enhanced SDR signal. SDR video today is 8-bit, 4:2:0, ITU Rec. 709 data. SDR' may have the same color space (primaries and white point) as SDR, but may use high precision, say 12-bits per pixel, with all color components at full spatial resolution (e.g., 4:4:4 RGB). From FIG. 2, SDR can easily be derived from an SDR' signal using a set of forward transforms that may include quantization from say 12 bits per pixel to 8 bits per pixel, color transformation, say from RGB to YUV, and color subsampling, say from 4:4:4 to 4:2:0. The SDR output of converter 210 is applied to compression system 220. Depending on the application, compression system 220 can be either lossy, such as H.264 or MPEG-2, or lossless. The output of the compression system 220 may be transmitted as a base layer 225. To reduce drift between the encoded and decoded signals, encoder 130 may follow compression process 220 with a corresponding decompression process 230 and inverse transforms 240, corresponding to the forward transforms of 210. Thus, predictor 250 may have the following inputs: VDR input 205 and either SDR' signal 245, which corresponds to the SDR' signal as it will be received by a corresponding decoder, or input SDR' 207. Predictor 250, using input VDR and SDR' data will create signal 257 which represents an approximation or estimate of input VDR 205. Adder 260, subtracts the predicted VDR 257 from the original VDR 205 to form output residual signal 265. Subsequently (not shown), residual 265 may also be coded by another lossy or lossless encoder, and may be transmitted to the decoder as an enhancement layer.

Predictor 250 may also provide the prediction parameters being used in the prediction process as metadata 255. Since prediction parameters may change during the encoding process, for example, on a frame by frame basis, or on a scene by scene basis, these metadata may be transmitted to the decoder as part of the data that also include the base layer and the enhancement layer.

Since both VDR 205 and SDR' 207 represent the same scene, but are targeting different displays with different characteristics, such as dynamic range and color gamut, it is expected that there is a very close correlation between these two signals. For example, U.S. application 61/475,359 filed 14 Apr. 2011, "Multiple color channel multiple regression predictor" by Guan-Ming Su et al., describes a multivariate, multi-regression (MMR) predictor 250 that allows the input VDR signal to be predicted using its corresponding SDR' signal and a multivariate MMR operator. Such a predictor can be considered a "blind" predictor in the sense that it does not take into consideration how the SDR' signal was generated out of the original VDR signal. In this invention, we present a novel predictor that minimizes the prediction error under the assumption that the SDR' signal was generated from the VDR signal using primary color correction operations, such as lift, gain, gamma, and hue and saturation changes.

Example Color Grading Models

We define as color grading the pre-production or mastering process where a professional colorist, the director, or the like, may set tones and colors of pixels in the image so that when viewed, the image has a desired appearance that agrees with the director's creative intent. For example, a director may wish the sky to look brighter or a scene to look darker, stand out, or be less prominent. Adjusting tones and colors of pixels in an image may include performing color grading (sometimes referred to with the legacy term 'color timing') on the source video data. Color grading may be performed using a hardware/software system that permits a user to change the video data in various ways to achieve a desired appearance on a target display.

The main controls in primary color correction are: lift, gain, and gamma (LGG) controls, and hue and saturation (H.S.) controls. Lift changes the darkness, gain changes the brightness, and gamma changes the mid-tones.

Given input x, and lift (L), gain (G), and gamma parameters, the LGG-corrected output y is given by:

$$y = G \cdot (x + L \cdot (1-x))^{gamma}. \tag{1}$$

Given input 1×r vector x (say, $x=[x_1, x_1, \ldots, x_r]$), where r represents the number of color components of an input pixel, the hue and saturation operations can be expressed as a matrix-vector multiplication $$y = xM, \tag{2}$$

where M is an r×r transformation matrix and y is an 1×r output vector. For example, if the input pixels are defined in the RGB color space, r=3, and M will be a 3×3 matrix.

Figure 3:
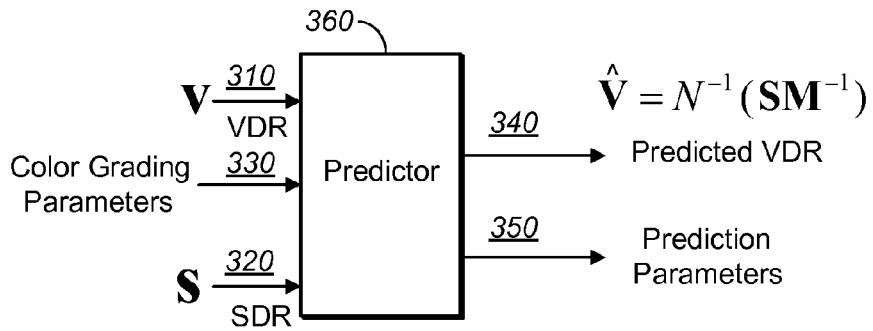
FIG. 3 depicts input and output interfaces of a predictor based on a primary color grading model, according to an embodiment of the present invention.

FIG. 3 shows input and output interfaces of predictor 360 according to an example implementation of this invention. From FIG. 3, predictor 360 receives input vectors v 310 and s 320 representing VDR and SDR image data respectively, and outputs vector $\hat{v}$ 340, representing the predicted value of input v. Optionally, predictor 360 may also receive input metadata 330 related to the color grading process that was used to derive s from v. Predictor 360 may also output computed prediction parameters 350 which may be passed to a decoder as metadata.

Example Notation and Nomenclature

Assuming images are represented by pixels, where each pixel has n color components, in an example implementation where n=3, denote the three color components of the i-th pixel in the SDR image 320 as $$s_i = [s_{i1} s_{i2} s_{i3}]. \tag{3}$$

Denote the three color components of the i-th pixel in the VDR input 310 as $$v_i = [v_{i1} v_{i2} v_{i3}]. \tag{4}$$

Denote the predicted three color components of the i-th pixel in predicted VDR 340 as $$\hat{v}_i = [\hat{v}_{i1} \hat{v}_{i2} \hat{v}_{i3}]. \tag{5}$$

Denote the total number of pixels in one color component as p. In equations (3-5), image pixels may be in RGB, YUV, YCbCr, XYZ, or any other color representation. While equations (3-5) assume a three-color representation for each pixel in an image or video frame, as also shown later, the methods described herein can be easily extended to image and video representations with more than three color components per pixel, or to image representations where one of the inputs may have pixels with a different number of color components than the other input.

From equations (1) and (2), given a VDR input v, assuming the SDR signal is created via a two-stage operation; namely, non-linear operations on each individual color channel for range adjustments, and a linear transform for hue and saturation adjustments, then according to an example implementation of this invention, the VDR to SDR model can be expressed as $$s = N(v)M, \tag{6}$$

where N( ) is a non-linear function and M is a matrix operator. Function N( ) can be any non-linear function being used in tone mapping or color-gamut transformation. It is desirable, but not a requirement, that function N( ) is invertible; that is, given y=N(x), there is a corresponding function $N^{-1}( )$, such that $x=N^{-1}(y)$.

An example of a sigmoid-like N( ) function is presented in International Patent Application No. PCT/US2012/029189 filed on 15 Mar. 2012. Alternatively, in another example implementation as described herein, N( ) may represent a non-linear function in a slope-offset-power (SOP) format, as described in "ASC color decision list (ASC CDL) transfer functions and interchange syntax", by J. Pines and D. Reisner, published by the American Society of Cinematographers, (document: ASC-CDL_Release 1.2, 2009-05-04).

From equation (6), given input SDR signal s, output $\hat{v}$, an approximation of the original VDR signal v, can be derived using $$\hat{v} = N^{-1}(sM^{-1}), \tag{7}$$

where $N^{-1}( )$ is the invert of N( ) and $M^{-1}$ is the invert of M.

The traditional lift, gain, and gamma operations, individually or in combination, can be readily translated into slope, offset, and power (SOP) operations as described herein. Given input x and SOP parameters Slope, P (power), and O (offset), SOP operations can be expressed as, $$N(x) = (\text{Slope} \cdot x + O)^P, \tag{8}$$

and $$N^{-1}(y) = \frac{1}{\text{Slope}}(y^{1/P} - O). \tag{9}$$

From equations (6-9), if the output of the VDR to SDR process (say, 145 or 320) provides to the predictor (say, 250 or 360) the color grading parameters used to create the SDR input, then predictor 360 can derive an estimate of the VDR input using equations (7) and (9). In this prediction model, referred herein as the SOP+M model, the color grading parameters being used are a list of slope, P, and O parameters (collectively referred to as the ASC Color Decision List (ASC CDL), and the elements of the linear transform matrix M which may represent the product of all matrices being used for hue and saturation transforms. In practice however, these M and SOP parameters may not be available. In that case, predictor 360 will have to estimate them. An example predictor that estimates these parameters is described next.

Example Prediction Using SOP+M Color Grading Model

In equation (7), notation is simplified, as the matrix $M^{-1}$ may be denoted as $$M^{-1} = \begin{bmatrix} m_1 \\ m_2 \\ m_3 \end{bmatrix}, \tag{10}$$

wherein $m_j = [m_{j1}\ m_{j2}\ m_{j3}]$, for j=1,2, 3, denotes a 1×3 vector corresponding to the j-th row in $M^{-1}$ and representing the linear hue and saturation color transformations related to deriving the j-th color component of the predicted output pixel.

From (7) and (9), $N^{-1}()$ and $M^{-1}$ may be combined into a single prediction function and apply non-linear regression methods to estimate the free parameters $m_{ij}$, $Slope_i$, $P_i$, and $O_i$, (i and j=1, 2, 3) as follows:

$$\hat{v}_{ij} = \frac{1}{Slope_j}((m_j s_i^T)^{1/P_j} - O_j), i = 1, 2, \ldots, p, \text{ and,} \tag{11}$$

$$j = 1, 2, 3.$$

In equation (11), $s_i^T$ denotes the transpose of vector $s_i$, and the j-th color component of pixel depends on all three color components of the corresponding $s_i$ pixel. Thus, unlike other single-color channel predictors, the SOP+M predictor is an inter-color predictor and thus can better predict hue and saturation transformations during the color grading process.

From equation (11), each predicted VDR color channel j can be expressed as a non-linear function dependent on six free parameters ($m_{j1}$, $m_{j2}$, $m_{j3}$, $Slope_j$, $P_j$, and $O_j$). Thus, for VDR and SDR images with 3-color components, the SOP+M prediction model requires a total of 18 prediction parameters. Taking into consideration all pixels in an image, equation (11) can be also expressed as $$\hat{V} = NS^{-1}(c, S), \tag{12}$$

where $NS^{-1}()$ represents a non-linear function with inputs $$S = \begin{bmatrix} s_0 \\ s_1 \\ \vdots \\ s_{p-1} \end{bmatrix}, \tag{13}$$

and a 1×18 "SOP+M" parameter vector c=[$c_1\ c_2\ c_3$], where $c_j$=[$m_{j1}$, $m_{j2}$, $m_{j3}$, $Slope_j$, $P_j$, and $O_j$], (j=1, 2, 3), and $$\hat{V} = \begin{bmatrix} \hat{v}_0 \\ \hat{v}_1 \\ \vdots \\ \hat{v}_{p-1} \end{bmatrix}. \tag{14}$$

Given the system of non-linear equations (12), one approach to solve for parameter vector c is by solving the optimization problem $$\min_{c} \varepsilon = \|V - \hat{V}\|^2, \tag{15}$$

where ε denotes the prediction error.

An example embodiment computes this minimization problem with application of numerical, non-linear regression processes. An embodiment may implement the numerical, non-linear regression processes, for example, with the Levenberg-Marquard method described in Chapter 10 of the book *"Numerical Optimization,"* by J. Nocedal and S. J. Wright, Springer, 1999. While the Levenberg-Marquard method is a descriptive example, embodiments of are not limited to computing the numerical, non-linear regression processes with this particular method. On the contrary; embodiments of the present invention are well suited to compute the numerical, non-linear regression processes with other methods, as well.

Figure 4:
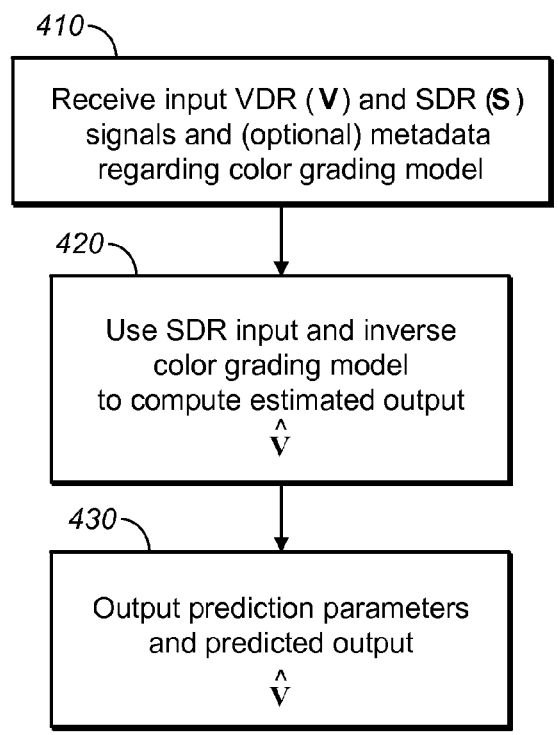
FIG. 4 depicts an example prediction process that takes into consideration the color grading process according to an embodiment of the present invention.

FIG. 4 depicts an example implementation of a prediction process 400 that takes into consideration the color grading process that was applied to derive input SDR from input VDR. In step 410, process 400 receives SDR and VDR inputs plus optional metadata characterizing the color grading process used to derive the SDR signal from the VDR signal. For example, such metadata may include the color mapping function N( ), a color transformation matrix M, or color decision list (CDL) data representing a sequence of LGG or SOP steps applied to the original VDR image. In step 420, process 400 applies an inverse color grading model to compute an estimate of the VDR input. If any of the color grading model parameters were missing, they will be estimated in step 420 as well. Finally, the predicted VDR and any associated prediction parameters are output in step 430.

Prediction process 400 can be repeated at a variety of time intervals, as deemed necessary to maintain coding efficiency while processing requirements are within the available computing resources. For example, when coding video signals, process 400 can be computed for each frame, a part of a frame, or a group of frames, whenever the prediction residual error exceeds a particular threshold, or using a combination of criteria.

Prediction process 400 can also use all available input pixels or a sub-sample of those pixels. In one example implementation, one may use pixels only from every k-th pixel row and every k-th pixel column of the input data, where k is an integer equal or higher than two. In another example implementation one may decide to skip input pixels that are below a certain clipping threshold (for example, very close to zero) or pixels that are above a certain saturation threshold (for example, for n-bit data, pixel values that are very close to $2^n-1$.) In yet another implementation, one may use a combination of such subsampling and thresholding techniques in order to reduce the pixel sample size and accommodate the computational constrains of a particular implementation.

Figure 5:
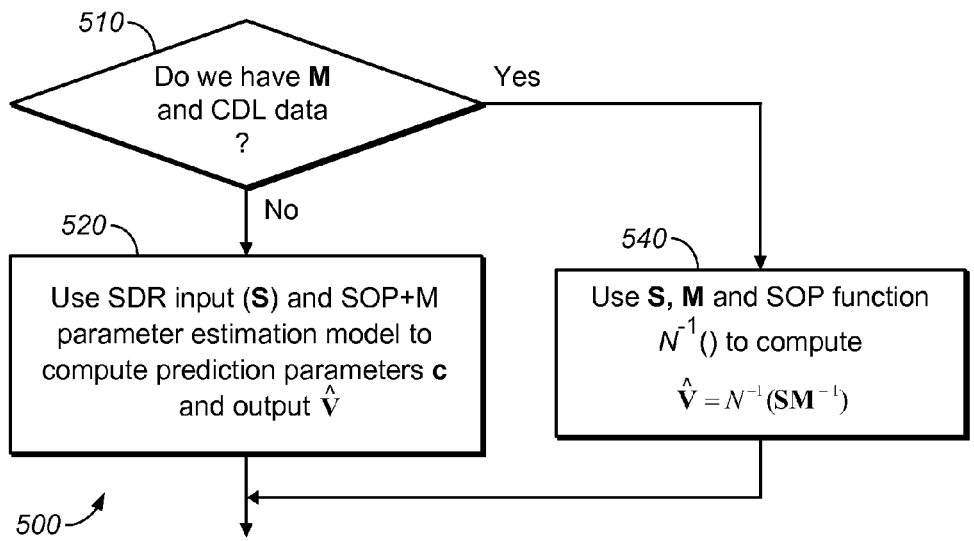
FIG. 5 depicts an example prediction process according to an SOP+M color grading model of this invention.

FIG. 5 depicts in more detail an example implementation of step 420 when the color grading process is based on a SOP+M model. If the predictor has full access to the hue/saturation transformation matrix M and the color decision list (CDL), then, in step 540, the predictor can apply equation (7). Otherwise, in step 520, the predictor can use the system of equations (12) to formulate an optimization problem and solve for the prediction parameters vector c. In an example implementation, this system of equations can be solved my minimizing the prediction error using non-linear regression techniques as discussed earlier.

Applying the SOP+M Model to Images with More than Three Primary Colors

All of the proposed color-grading-based prediction models can easily be extended to images that are expressed with more than three primary colors. As an example, we consider the case where an SDR signal has three primary colors, say RGB, but the VDR signal is defined in the P6 color space, with six primary colors. In this case, equations (3-5) can be re-written as $$s_i = [s_{i1} s_{i2} s_{i3}],\qquad(16)$$

$$v_i = [v_{i1} v_{i2} v_{i3} v_{i4} v_{i5} v_{i6}],\qquad(17)$$

and $$\hat{v}_i = [\hat{v}_{i1} \hat{v}_{i2} \hat{v}_{i3} \hat{v}_{i4} \hat{v}_{i5} \hat{v}_{i6}].\qquad(18)$$

As before, denote the number of pixels in one color component as p. Given equations (16-18), the SOP+M predictor of equation (11), can be expressed as $$\hat{v}_{ij} = \frac{1}{Slope_j}((m_j s_i^T)^{1/P_j} - O_j), j = 1, 2, \ldots, 6, \text{ and}\qquad(19)$$

$$i = 1, 2, \ldots, p,$$

where $m_j$ denotes the j-th row vector of coefficients of a 6×3 matrix $M^{-1}$, as described earlier. Under this example implementation, in the SOP+M model of equation (12), the parameter vector c will consist of 36 total unknown parameters per set of p image pixels, which can be computed using the methods described earlier. Note also that $M^{-1}$ as defined herein is only an approximate representation of the inverse color transformation process under the SOP+M model. For non square M matrices (resulting when the VDR and SDR images don't have the same number of color components), $M^{-1}$ is more closely related to the pseudo-inverse of M.

Image Decoding

Figure 6:
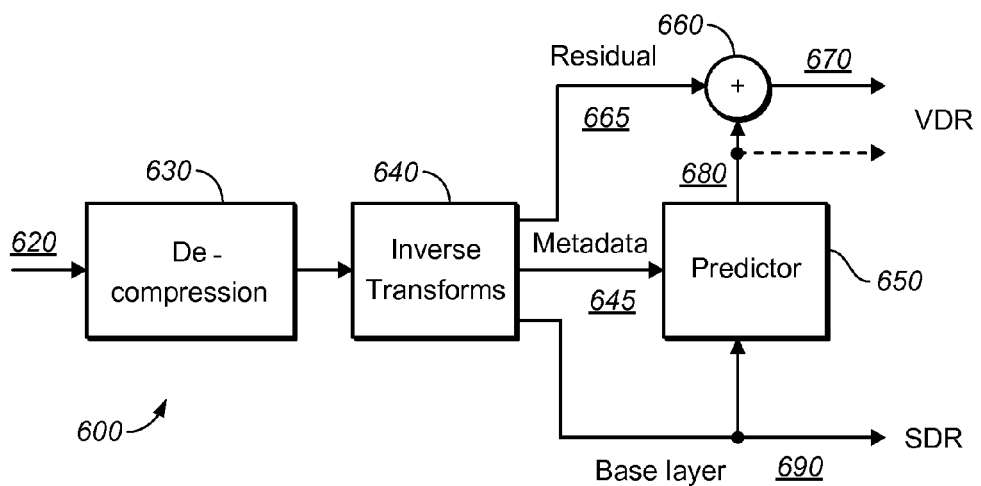
FIG. 6 depicts an example image decoder with a predictor operating according to the embodiments of this invention.

Embodiments of the present invention may be implemented either on an image encoder or an image decoder. FIG. 6 shows an example implementation of decoder 150 according to an embodiment of this invention.

Decoding system 600 receives a coded bitstream that may combine a base layer 690, an optional enhancement layer (or residual) 665, and metadata 645, which are extracted following decompression 630 and miscellaneous inverse transforms 640. For example, in a VDR-SDR system, the base layer 690 may represent the SDR representation of the coded signal and the metadata 645 may include information about the prediction model that was used in the encoder predictor 250 and the corresponding prediction parameters. In one example implementation, when the encoder uses a color-grading-based prediction model according to the methods of this invention, metadata may include the color transformation matrix M, the CDL data, information about the N( ) color transform function, or the values of the color grading parameter vector c. Given base layer 690 s and the color grading parameters extracted from the metadata 645, predictor 650 can compute predicted îT 680 using either equation (7) or equations (11-12). If there is no residual, or the residual is negligible, the predicted value 680 can be output directly as the final VDR image. Otherwise, in adder 660, the output of the predictor (680) is added to the residual 665 to output VDR signal 670.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to color-grading-based prediction, such as those described herein. The computer and/or IC may compute, any of a variety of parameters or values that relate to the color-grading-based prediction as described herein. The image and video dynamic range extension embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement color-grading-based prediction methods as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

Equivalents, Extensions, Alternatives and Miscellaneous

Example embodiments that relate to applying color grading-based prediction in coding VDR and SDR images are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An image prediction method comprising:
   receiving a first image and a second image, wherein the second image has different dynamic range than the first image;
   receiving metadata related to a color grading process, wherein the color grading process is used to derive the second image from the first image, wherein the metadata that relates to the color grading process comprise a color transformation matrix M and at least one of slope S, offset O, and power P parameters of a non-linear function;
   applying said first image and second said image into an inverse color grading prediction process to compute an output image that represents the predicted value of the first image, wherein the inverse color grading prediction process comprises a non-linear prediction process which includes the at least one of the slope S, offset O, and power P parameters and is related to the color transformation matrix M; and
   outputting the output image.

2. The method of claim 1, wherein the non-linear prediction process comprises applying a linear operator $M^{-1}$ to the second image to generate intermediate values, and applying a non-linear function to the intermediate values to generate the output image.

3. The method of claim 2, wherein the output image is generated according to $$\hat{V} = N^{-1}(sM^{-1})$$

where s denotes pixels of the second image, $\hat{V}$ denotes pixels of the output image, and $M^{-1}$ comprises an inverse of the color transformation matrix M, and $N^{-1}(sM^{-1})$ denotes the non-linear function as it is applied to $sM^{-1}$.

4. The method of claim 3, wherein for an input y and slope $S \neq 0$, the non-linear function $N^{-1}(y)$ computes an output using the slope S, offset O, and power P parameters according to the following equation:

$$N^{-1}(y) = \frac{1}{S}(y^{1/P} - O).$$

5. An image prediction method comprising:
   receiving a first image and a second image, wherein the second image has different dynamic range than the first image;
   applying said first image and said second image into a non-linear prediction process which includes at least one of a slope S, offset O, and power P parameters of a non-linear function and an inverse matrix $M^{-1}$ of a color transformation matrix M to compute an output image that represents the predicted value of the first image, wherein the non-linear prediction process comprises applying a linear operator based on the inverse matrix $M^{-1}$ to the second image to generate intermediate values, and applying a non-linear function to the intermediate values to generate the output image; and
   outputting the prediction parameters of the non-linear prediction process and the output image.

6. The method of claim 5, wherein the output image is generated according to $$\hat{V} = NS^{-1}(c, S),$$

where S denotes pixels of the second image, $\hat{V}$ denotes pixels of the output image, $NS^{-1}(c, S)$ represents the non-linear function with inputs of the second image and a parameter vector c, and the parameter vector c comprises the prediction parameters $M^{-1}$, S, O, and P.

7. The method of claim 6, wherein for slope $S \neq 0$ the non-linear function $NS^{-1}(c, S)$ computes an output using parameters related to slope S, offset O, and power P according to the following equation:

$$\hat{v}_i = \frac{1}{S}((m \ s_i^T)^{1/P} - O),$$

where $\hat{v}_i$ denotes a pixel value for a color component of the output image, m denotes a vector related to the matrix $M^{-1}$, and $s_i^T$ denotes the transpose of a vector of pixel values of the second image.

8. The method of claim 7, wherein the $M^{-1}$, S, O, and P parameters of the prediction model are generated by solving an optimization problem to minimize a prediction error between the first image and the output image.

9. The method of claim 1 or claim 5, wherein the first image comprises a visual dynamic range (VDR) image and the second image comprises a standard dynamic range (SDR) image.

10. The method of claim 1, wherein one or more of the slope, offset, or power parameters are received as part of a color decision list.

11. An image decoding method comprising:
    receiving a first image with a first dynamic range;
    receiving metadata related to a color grading process, wherein the color grading process is used to derive the first image from a second image that has a second dynamic range that is different than the first dynamic range, wherein the metadata that relates to the color grading process comprise a color transformation matrix M and at least one of slope S, offset O, and power P parameters of a non-linear function; and
    applying the first image and the metadata into an inverse color grading prediction process to compute an output image that represents the predicted value of the second image,
    wherein the inverse color grading prediction process comprises a non-linear prediction process which includes the at least one of slope S, offset O, and power P parameters and is related to the color transformation matrix M.

12. The method of claim 11, wherein the non-linear prediction process comprises applying a linear operator $M^{-1}$ to the first image to generate intermediate values, and applying a non-linear function to the intermediate values to generate the output image.

13. The method of claim 12, wherein the output image is generated according to $$\hat{V}=N^{-1}(sM^{-1}),$$

where $N^{-1}(sM^{-1})$ denotes the non-linear function as it is applied to the intermediate values $sM^{-1}$, where s denotes pixels of the first image, $\hat{V}$ denotes pixels of the output image, and $M^{-1}$ denotes the linear operator which comprises an inverse of the color transformation matrix M.

14. The method of claim 13, wherein for an input y and slope S≠0, the non-linear function $N^{-1}(y)$ computes an output based on the slope S, offset O, and power P parameters according to the following equation:

$$N^{-1}(y) = \frac{1}{S}(y^{1/P} - O).$$

15. The method of claim 11 wherein the first image comprises a standard dynamic range (SDR) image and the output image comprises a visual dynamic range (VDR) image.

16. In an encoder, an image prediction method, the method comprising:

receiving a first image and a second image, wherein the second image has different dynamic range than the first image;

detecting whether there is metadata related to a color grading process, wherein the color grading process is used to derive the second image from the first image, wherein the metadata that relates to the color grading process comprise a color transformation matrix M and at least one of slope S, offset O, and power P parameters of a non-linear function; if metadata related to a color grading process are detected, then:

applying said first image and second image into an inverse color grading prediction process to compute an output image that represents the predicted value of the first image, wherein the inverse color grading prediction process comprises a non-linear prediction process which includes the at least one of the slope S, offset O, and power P parameters and is related to the color transformation matrix M; and outputting the output image;

else:

applying said first image and said second image into a non-linear prediction process which includes at least one of a slope S, offset O, and power P parameters of a non-linear function and an inverse matrix $M^{-1}$ of a color transformation matrix M to compute an output image that represents the predicted value of the first image, wherein the non-linear prediction process comprises applying a linear operator based on the inverse matrix $M^{-1}$ to the second image to generate intermediate values, and applying a non-linear function to the intermediate values to generate the output image; and outputting the prediction parameters of the non-linear prediction process and the output image.

* * * * *